Oct. 12, 1965  J. B. HAMMER ETAL  3,211,633
FALLING FILM DISTILLATION UNIT APPARATUS
Filed May 28, 1962  2 Sheets-Sheet 1
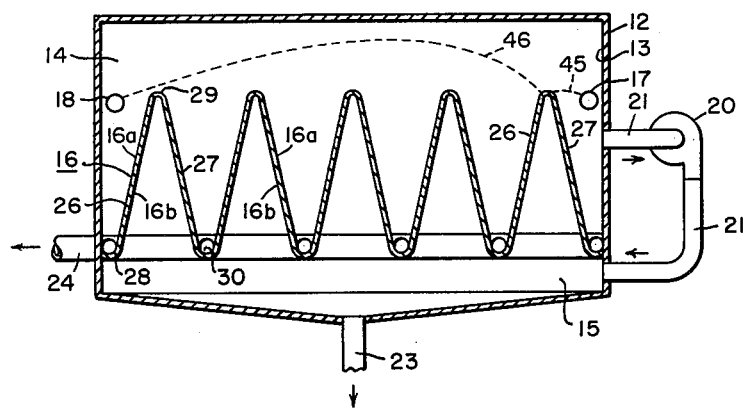
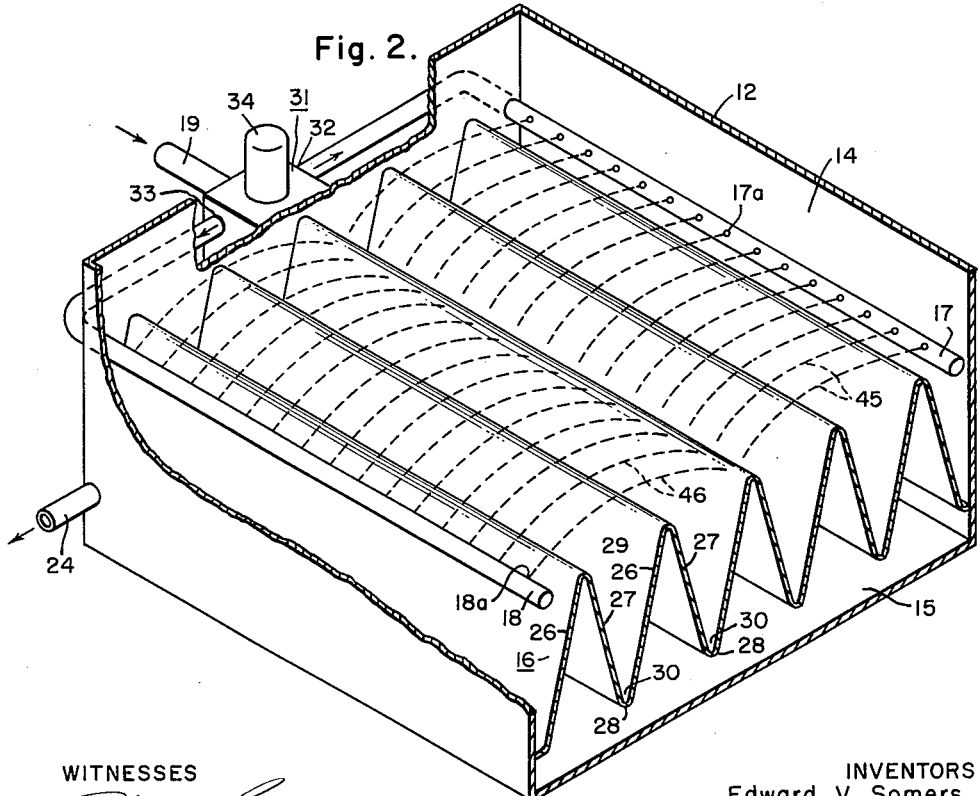
WITNESSES
Robert C. Baird
John E. Heasley, Jr.
INVENTORS
Edward V. Somers &
Joel B. Hammer.
BY
Frank Cristiano Jr.

United States Patent Office 3,211,633
Patented Oct. 12, 1965

3,211,633
FALLING FILM DISTILLATION UNIT APPARATUS
Joel B. Hammer, Penn Hills, and Edward V. Somers, Wilkins Township, Allegheny County, Pa., assignors to Westinghouse Electric Corporation, East Pittsburgh, Pa., a corporation of Pennsylvania
Filed May 28, 1962, Ser. No. 197,998
10 Claims. (Cl. 202—236)

This invention relates to heat exchange apparatus and, more particularly, to liquid evaporation apparatus of the type having evaporator surfaces onto which the evaporable liquid, such as saline or otherwise impure water, is distributed in a thin film.

A general object of this invention is to provide an improved arrangement for distributing liquid onto evaporator plate structure for vaporization purposes.

A further object is to provide liquid evaporating apparatus in which evaporator structure is fed with liquid for evaporation purposes by spray nozzle structures arranged in such a manner that the issuing spray traverses the evaporator structure in a predetermined manner to distribute the liquid thereon.

A more specific object is to provide liquid evaporating apparatus having a structure for distributing a liquid spray onto the evaporator structure, which distributing structure is low in initial cost, reliable in operation and permits employment of considerably fewer spray nozzles than heretofore, thereby permitting employment of relatively larger nozzle apertures with attendant reduction in erosion, corrosion and clogging characteristics of the nozzles.

The invention is particularly, though not exclusively, suited for incorporation in apparatus for converting saline or otherwise impure water into potable water by evaporation.

Briefly, in accordance with the invention, there is provided liquid evaporating apparatus having a plurality of evaporator plate members disposed in horizontally spaced side-by-side relation with each other and inclined with the horizontal, spray nozzle structure for spraying pressurized liquid into the plate members, and means for cyclically varying the spray pattern so that liquid is sprayed onto each other of the plate members in a predetermined sequence. The spray nozzle structure is preferably fixed and the variable spray pattern may be attained by a variable liquid pressure control device effective to vary the pressure of the liquid from a minimum value to a maximum value, thereby varying the length of the spray trajectory from a minimum to a maximum value, respectively.

The evaporator plate members may be grouped into first and second series alternately disposed and inclined in opposite directions with the horizontal and the spray nozzle structure may include a first bank of nozzles disposed adjacent one end of the array of plates and a second bank of nozzles disposed adjacent the opposite end of the array. The sprays from the two banks of nozzles are correlated in such a manner that when one of the sprays is at maximum velocity the other is at minimum velocity. Hence all of the plate members are supplied with liquid at substantially the same rate, which is highly desirable for promotion of the thin liquid film thereon required for optimum evaporation.

The above and the objects are effected by the invention as will be apparent from the following description and claims taken in connection with the accompanying drawings, forming a part of this application, in which:

FIGURE 1 is a schematic view of liquid evaporation apparatus having liquid distribution structure incorporating the invention;

FIG. 2 is an isometric view of the apparatus shown in FIG. 1 with casing portions cut away to illustrate the liquid distribution structure;

Figure 3:
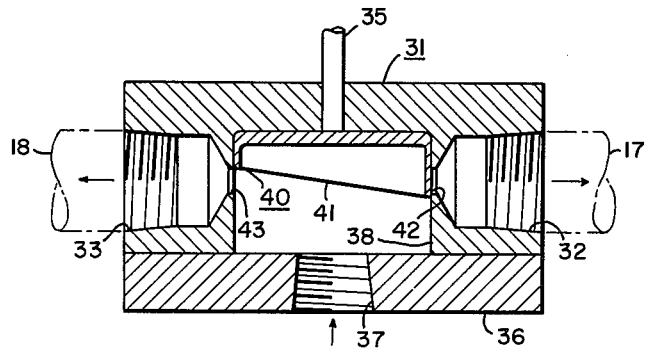
FIG. 3 is a cross-sectional view of a device having a cam member for cyclically varying the pressure of the liquid supplied to the distribution structure shown in FIG. 2.

Referring to the drawings in detail, in FIG. 1 there is shown liquid evaporation apparatus for evaporating impure liquid, for example saline or otherwise impure water to provide pure water, and having the invention incorporated therein. The liquid evaporation apparatus shown in FIG. 1 is generally of a known type and includes shell or casing structure 12 defining an enclosed chamber 13 divided into an evaporating compartment 14 and a condensing compartment 15 by a heat exchanger plate structure 16. The heat exchanger plate structure 16 has two faces. One of the faces 16a faces the evaporating compartment 14 and may be termed the evaporating face, while the opposite face 16b faces the condensing compartment 15 and may be termed the condensing face.

Heated impure water is sprayed into the evaporating compartment 14 by a pair of spray nozzle structures 17 and 18 supplied by a suitable supply conduit 19. As the water is distributed over the evaporating face 16a of the heat exchanger plate structure 16, some of the water vaporizes and the resulting vapor is withdrawn from the evaporating compartment 14 by a suitable pump 20 interposed in conduit structure 21 providing a communication between the evaporating compartment 14 and the condensing compartment 15. As the pump 20 causes the vapor to flow into the compartment 15, the work done by the pump 20 to conduct the vapor heats and pressurizes the vapor to a moderately higher degree. Accordingly, the evaporating compartment 14 is operated at a slightly reduced atmospheric value with relation to the compartment 15, and the vapor in the condensing compartment 15 is effective to heat the heat exchanger plate structure 16 as the vapor fills the condensing compartment. The heated plate structure is thereby effective to continue the evaporation of the water collected on the evaporating side thereof. As the vapor is cooled on the condensing face 16b the condensate gravitates to the bottom of the casing structure 12 and is drawn therefrom as pure water through a suitable discharge conduit 23 for useful purposes.

The water for evaporation supplied by the spray nozzle structure 17 and 18 is in excess of that required for evaporation, and the resulting unvaporized water flows downwardly along the heat exchanger plate structure 16, collecting at the bottom thereof and being drained therefrom through a suitable drain conduit 24. Since the liquid drained by the conduit 24 is enriched with impurities, it may be discarded from the system.

The heat exchanger structure 16, hereafter termed an evaporator plate structure, includes a first series of evaporator plates structures 26 extending downwardly and inclined with the horizontal in one direction and a second series of evaporator plate structures 27 extending downwardly and inclined with the horizontal in the opposite direction. The first and second series of plate structures are alternately arranged with respect to each other and joined at the corresponding lower and upper portions 28 and 29, respectively, in a serpentine pattern. The lower connecting portions 28 from troughs 30 which serve to collect the excess liquid delivered to the evaporator plate structure 16 for withdrawal from the system through the conduit 24.

Although in the embodiment shown in FIGS. 1 and 2, only five pairs of plate structures 26 and 27 have been illustrated as forming the evaporate plate structure 16, in actual practice a very large number of such plates may be provided. This number may be on the order of hundreds of plate members. Since the apparatus of this type, to promote optimum evaporation of the liquid, it is desirable to form a thin film of evaporable liquid on the evaporating surfaces 16a of the plate structure 16, it is essential that the liquid for evaporation be supplied to the plate members 26 and 27 in a smooth distribution pattern and at a generally uniform rate, so that the plates neither run dry nor flood during operation. However, to provide each pair of the plate members 26 and 27 with a separate spray nozzle structure as heretofore taught by the prior art, would entail excessively high manufacturing costs.

In accordance with the invention, the two nozzle structures 17 and 18 are formed as tubular manifolds, each provided with a large plurality of apertures 17a and 18a, respectively, disposed in substantially mutually facing relation, and the nozzle structures or manifolds 18 and 17 are disposed adjacent and beyond the endmost plate 26 at the left end and plate 27 at the right end, respectively, as viewed in FIG. 1.

The heated impure water delivered by the supply conduit 19 is directed into a variable liquid pressure regulating device 31 having a pair of outlets 32 and 33 connected to the manifolds 17 and 18, respectively, so that the two manifolds are fed by liquid at variable pressure and flow rate by the regulating device 31. The pressure regulating device 31 may be continuously operated, during operation, by a suitable motor 34 having an output shaft 35 and, as best shown in FIG. 3, includes a housing 36 having an inlet 37 connectable to the liquid supply conduit 19. The housing 36 is provided with a cylindrical bore 38 within which is rotatably received a closely fitting cylindrical rotor structure 40 connected to the shaft 35 of the motor 34. The rotor 40 has a cylindrical cam surface portion 41 cooperatively associated with a pair of ports 42 and 43 disposed in the housing 36 and communicating with the outlets 32 and 33, respectively.

During operation, the rotor 40 is rotated at a steady rate of speed to cyclically vary the opening of each of the ports 42 and 43, thereby to vary the pressure (and hence the flow rate) of the liquid from the supply conduit 19 to the manifolds 17 and 18, as determined by the degree of opening of these ports. Accordingly, when the port 42 is in the blocked position shown in FIG. 3, no liquid will flow to the manifold 17. However, when one of the ports such as 43 is in the fully open position, liquid will flow therethrough to the manifold 18 at full flow rate and pressure value and the velocity of the ensuing spray from the manifold 18 will be at its maximum.

The apertures 17a and 18a in the two manifolds are inclined in slightly upwardly facing direction so that, in operation, the sprays 45 and 46 issuing therefrom (see FIG. 1) assume a ballistic trajectory. The velocity of the liquid spray attained varies as a function of the pressure of the liquid supplied to the manifolds. Accordingly, the spray that has the greatest pressure will have the highest velocity and the longest trajectory.

Figure 4:
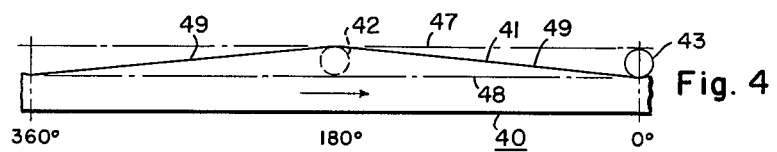
FIG. 4 is a developed view of the cam and associated port structure of the device shown in FIG. 3.

Referring to FIG. 4, the cam surface portion 41 of the rotor 40 has been illustrated in inverted developed form, with the zero degree position at the right and the 360° position at the left, and with the direction of movement of the cam surface 41 from left to right in a manner to sweep past the ports 42 and 43. In this embodiment, the ports 42 and 43 are of circular shape and the cam surface 41 rises from a minimum at the 0° position to a maximum at the 180° position and then back to the minimum at the 360° position, at a uniform or linear rate. The two phantom lines 47 and 48 disposed in horizontal parallel relation with each other define the upper and lower limits of the ports 42 and 43. It will readily be seen that, in the position shown in FIG. 4, the port 43 is in its maximum open position while the port 42 is in the fully closed position.

Figure 5:
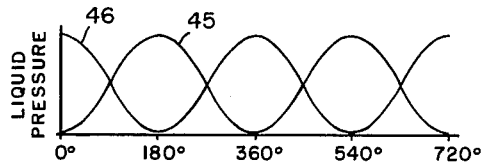
FIG. 5 is a chart showing variable pressure curves attained with the cam and port structure shown in FIG. 4.

Referring to FIG. 5, there is shown a chart plotting liquid pressure as the ordinate, and angular degrees of the cam structure 41 as the abscissa, the angular degrees being shown as extending from zero to 720° or 2 revolutions of the cam surface 41. However, for simplicity of explanation, liquid pressure, rate of flow and spray velocity will be referred to, in connection with the plots, since they are all related to each other.

Since the cam structure 44 varies linearly, as indicated by the inclined surface portions 49, and since the ports 43 and 42 are circular in shape, the liquid pressure and therefore the velocities of the sprays 46 and 45 vary generally in a sinuosoidal manner, as the rotor 40 is rotated. Also, since the two ports 42 and 43 are diametrically opposed, the velocity curves of sprays 45 and 46 are disposed in 180° out-of-phase relationship with respect to each other.

Considering the velocity of the spray 46, it will be noted that, when the cam 41 is in the position shown in FIG. 4, the spray velocity is at its maximum value. Hence the trajectory is at its maximum and the spray will impinge on the farthermost surface plate 26 with respect to the manifold 18 (FIG. 1). However, as the cam surface is moved to the right by rotation of the rotor, as indicated in FIG. 4, the degree of opening of the port 43 becomes steadily smaller and the velocity of the spray is reduced in a generally sinusoidal manner. During such variations in velocity from a maximum value to a minimum value, the trajectory of the spray 46 decreases accordingly, and the spray will thus impinge upon each of the other plates 26 in succession, progressing from right to left until at the minimum velocity value (180° in FIG. 5) the spray will impinge on the first plate 26. During the time that the spray 46 is varying from its maximum to its minimum velocity, the spray 45 is increasing in velocity from minimum to maximum so that, in effect, it substantially follows the end of the trajectory of the spray 46 and in so doing the spray 45 will impinge successively on the plates 27, progressing from right to left, until it strikes the last plate 27 at the left.

As the cam rotor 40 continues to rotate from the 180° point to the 360° point, the conditions are reversed. That is, the port 43 is progressively opened and the spray 46 from the manifold 18 progressively increases in velocity and thus increases its range from left to right, thereby impinging on each of the plates 26 in succesison, from left to right. At the same time, the port 42 is progressively closed and the velocity of the spray 45 from the manifold 17 is concomitantly reduced. As the trajectory is thus decreased, the spray impinges on each of the plates 27 in succession, from left to right.

The rate of change of velocity of the two sprays 45 and 46 and/or the spray period may be selected, as desired, to suit the particular application. For example, the speed of rotation of the rotor 40 may be on the order of from 5 to 10 r.p.m. Considering a speed of 5 r.p.m. with the structure shown, since the ports 42 and 43 are blocked and unblocked once during every revolution, the velocity of each of the sprays 45 and 46 is varied from a minimum value to a maximum value in periods or cycles of 6 seconds.

During operation of the apparatus illustrated in FIGS. 1 and 2, as the sprays 45 and 46 are cyclically varied to direct the liquid onto the plate structures 26 and 27 in a sequential manner, the dwell time of such impingement on each of the plates is sufficient to deliver the required amount of liquid for evaporation on each of the plates. Usually, the amount of liquid applied to each of the plates is somewhat in excess of that required for evaporation, so that the plates are assured of being operated in a wet condition.

The evaporating surfaces 16a of the heat exchanger plate structure 16 may be formed in any desired manner to promote the spreading of the liquid in a thin film after it has been supplied thereto by the sprays 46 and 45. One particular surface configuration that may be employed to advantage in this arrangement is that disclosed and claimed in Joel B. Hammer patent application, Serial No. 197,660, filed May 25, 1962, and assigned to the same assignee as this invention.

The liquid pressure control device 31 may be modified, as desired, to provide different spray control characteristics by varying the rotational speed of the rotor 40, modifying the shape of the cam portion, and/or modifying the cross-sectional shape of the outlet ports.

Figure 6:
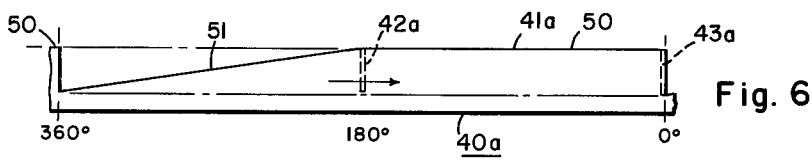
FIG. 6 is a view similar to FIG. 4 but illustrating another cam and port structure for cyclically varying the liquid spray from the manifold structure in FIG. 2.

Referring to FIG. 6, there is illustrated a developed view of a second embodiment employing a cylindrical rotor structure 40a similar to the rotor 40 but having an axially extending cam structure 41a including a dwell portion 50 of maximum height extending circumferentially from 0° to 180°, and an inclined portion 51 extending circumferentially from the dwell portion 50 at 180° to a minimum height at 360°. The ports 42a and 43a associated therewith, in this embodiment, are generally of rectangular shape and extend axially to a greater degree than circumferentially, so that as the cam structure 41a sweeps past the ports 42a and 43a successively, the flow therethrough is interrupted and initiated more sharply than with the embodiment shown in FIGS. 3 and 4.

In the position shown in FIG. 6, both of the ports 43a and 42a are in the blocked position so that no liquid flows therethrough to the manifolds 17 and 18, respectively. However, as the cam structure 41a moves to the right as indicated by the arrow, the port 42a will be gradually uncovered at a linear rate while the port 43a remains covered. This procedure occurs during the first 180° rotation of the cam structure 41a. By referring to FIG. 7, wherein a chart similar to that shown in FIG. 5 is shown, it will be noted that during this time the velocity of the spray 46a, indicated by the unbroken line, is increased at a linear rate, while the spray 45a, indicated by the dotted line, is completely shut off. At the end of the 180° rotation, the port 42a is completely blocked by the cam portion 50 with a substantially rapid cut-off effect, so that the spray velocity rapidly decays to zero at the 180° position. At the same time, the port 43a begins to open at a linear rate so that the velocity of the spray 45a increases at a linear rate. However, the sprays 46a and 45a are effectively in out-of-phase relationship with each other.

During operation of the cam structure 41a, the spray 46a increases from a minimum value to a maximum value thereby distributing the spray successively to each of the plates 26 (FIGS. 1 and 2) in a direction from left to right and it is then interrupted with a rapid cut-off. During this time, the spray 45 is in the minimum flow position and is ineffective to spray the plates 27. However, after the spray 46a decays to the minimum value, the spray 45a increases at the same rate to progressively distribute the spray onto the plates 27 from left to right during the next 180° rotation of the rotor structure 40a, and it is then interrupted with a rapid cut-off.

With this arrangement, after the spray 46a has distributed liquid to all of its associated plates 26, it is interrupted for a period of time sufficient to permit the liquid to flow downwardly on the plates 26 by gravitational effect to provide the liquid for evaporation. In the same manner, after the spray 45a has distributed its liquid onto its associated plates 27, it is interrupted for a period of time to permit the water directed thereon to flow downwardly by gravitational effect for evaporation.

For example, if the rotor 40a rotates at a speed of 5 r.p.m., the spray 46a is effective to wet all of the plates 26 associated therewith in a period of 6 seconds and then for a period of 6 seconds the spray is interrupted.

In a similar manner, the spray 45a is effective to provide liquid to its associated plates 27 for a period of 6 seconds and then is ineffective for a period of 6 seconds.

Figure 8:
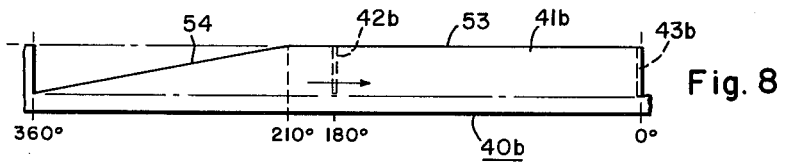
FIGS. 8 and 9 are views similar to FIGS. 6 and 7 but illustrating another cam and port structure with resulting variable pressure.

It may be desirable to modify the cyclical spray characteristics of the manifolds 17 and 18 further in order to permit more time for the water to flow downwardly on the plates 26 and 27. Referring to FIG. 8, there is shown a developed view of a third embodiment employing a cylindrical rotor structure 40b similar to the rotor 40 but having an axially extending cam structure 41b associated with a pair of outlet ports 43b and 42b. In this embodiment, the cam structure 41b is provided with a circumferential dwell portion 53 of angular extent equal to about 210° (or about 30° beyond the port 42b), and a second portion 54 inclined with the portion 53 and extending from 210° to 360°. The height of the cam surface portion 54 varies linearly from a maximum value at 210° to a minimum value at 360° and generally is effective in the same manner as the cam portion 51 shown and described in connection with FIG. 6. In the position shown in FIG. 8, both ports 42b and 43b are blocked. However, as cam structure 40b proceeds from left to right, the port 42b is progressively uncovered after an angular rotation of 30° and opened to its full extent upon additional rotation of 150°. The port 42b is opened at a linear rate.

Figure 7:
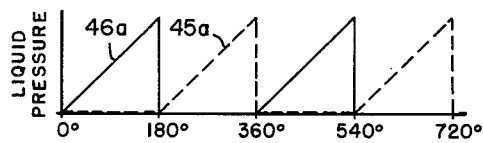
FIG. 7 is a chart showing the variable pressure curves attained with the cam and port structure shown in FIG. 6.
Figure 9:
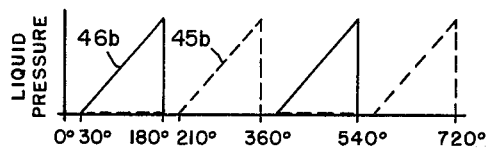

Referring to FIG. 9, wherein a chart is illustrated similar to that shown in FIG. 7, the velocity of the spray 46b is thus also varied linearly from a minimum to a maximum value. Immediately subsequent thereto, the dwell portion 53 is effective to block the port 42b in a rapid manner, thereby interrupting the spray 46b. During this portion of rotation, the port 43b is kept continuously blocked by the dwell portion 53. However, upon further rotation of 30°, the port 43b is initially uncovered by cooperation with the inclined cam portion 54 and is uncovered at a linear rate to its fully open position during the next 150° rotation. The velocity of the spray 45b thus increases in a linear manner from a minimum value to a maximum value in the same manner as the velocity of the spray 46b. Upon further rotation, the spray 45b is again interrupted by the dwell portion 53.

Referring to FIG. 9, it will be noted that there is a period of about 30° between each of the on periods for sprays 46b and 45b, where both of the sprays are interrupted and ineffective to provide liquid to their associated plate structures 26 and 27 (FIG. 1). For example, with a rotor speed of 5 r.p.m., the sprays 46b and 45b are effective, during each revolution, to alternately provide liquid onto their associated plate structures 26 and 27, respectively, for periods of about 5 seconds, and then for a period of 1 second neither of the sprays is effective. Hence, the spray 46b is effective to spray liquid for 5 seconds and then is ineffective to spray for 7 seconds and, in a similar manner, the spray 45b is effective to spray liquid for about 5 seconds and then is ineffective to spray liquid for about 7 seconds. With this arrangement, a larger amount of time is provided for the water supplied to the plates 26 and 27 to flow downwardly for evaporation.

Although several embodiments of the variable flow control arrangements for the sprays 45 and 46 have been illustrated for explantion purposes, it will be understood that the invention is not limited to these specific arrangements and that many other arrangements may be employed for varying the sprays, as required to suit a particular application.

It will now be seen that the invention provides liquid evaporation apparatus having means for periodically or cyclically providing liquid in spray form onto a plurality of spaced evaporator plate members in such a manner that each of the plates is assured of receiving substantially the same quantity of water per unit of time as its associated plates and that the rate of flow to the plates may be regulated as desired.

It will further be seen that liquid evaporation apparatus of the type having a large plurality of evaporator plate members is provided in which this large plurality of plate members may be provided with liquid by one or two manifolds in a system employing means for cyclically varying the spray to permit distribution of the liquid onto the plate members as required. Heretofore, in liquid evaporation apparatus of this type, it has been usually required to provide a spray manifold for each of the pairs of plates 26 and 27. This previous arrangement obviously is quite expensive to manufacture, since a considerably larger number of manifold spray nozzle structures would be required, especially in large installations having a large plurality of said plate structures.

Also where a large number of such manifold structures is employed, the apertures would necessarily have to be made relatively small, since the water is provided to the plate members in a continuous manner. However, with the invention, the nozzle apertures 17a and 18a in the manifolds 17 and 18, respectively, may be made of a considerably larger size since, even though more liquid is passed through the aperture, the dwell time for the sprays on the plate members 26 and 27 during traversal thereover is relatively short. With this arrangement, the operation of the apparatus is simplified and maintenance of the apparatus is reduced to a minimum, since erosion and corrosion of the nozzles as well as clogging by foreign particles in the impure liquid is minimized.

We claim as our invention:

1. Liquid evaporating apparatus comprising
a plurality of evaporator plate members disposed in spaced relation with each other and extending downwardly,
means including at least one nozzle for spraying liquid onto said plate members for evaporation,
and means for cyclically modifying the liquid spray so that liquid is sprayed on each of said plate members in a predetermined sequence during a liquid evaporating operation.

2. Liquid evaporating apparatus comprising
a series of evaporator plate structures extending downwardly and disposed in horizontally spaced relation with each other,
manifold structure,
a plurality of nozzles provided on said manifold structure and disposed adjacent one of the endmost evaporator plate structures in the series,
means for supplying a pressurized liquid to said manifold structure,
and means for cyclically varying the pressure of the liquid from a high value to a successively lower value sufficient to cause the liquid to spray onto the plate members in a sequential manner.

3. Liquid evaporating apparatus comprising
a first series of evaporator plate structures extending downwardly and inclined in one direction,
a second series of plate structures extending downwardly and inclined in the opposite direction,
said first and second series of plate structures being alternately arranged and joined at their corresponding lower and upper portions in a serpentine pattern,
first nozzle means for spraying a pressurized liquid onto said first series of plate structures,
second nozzle means for spraying a pressurized liquid onto said second series of plate structures,
means for cyclically varying the spray from said first nozzle means to cause the liquid to spray onto said first series of plate structures in a predetermined sequence, and
means for cyclically varying the spray from said second nozzle means to cause the liquid to spray onto said second series of plate structures in a predetermined sequence.

4. The structure recited in claim 3 in which
the first and second nozzle means are disposed adjacent opposite ends of the plate structures and in fixed substantially facing relation with each other, and
the cyclically varying means comprise means for varying the pressure of the liquid.

5. The structure recited in claim 3 in which
the first and second nozzle means are inclined in upward direction with respect to the horizontal and are effective to direct the liquid sprays in a ballistic trajectory.

6. The structure recited in claim 3 in which
the first and second nozzle means are disposed adjacent opposite ends of the plate structures and in mutually facing relation; and
the cyclically varying means are effective to concomitantly vary the spray from said first nozzle means and said second nozzle means in a predetermined pattern.

7. Liquid evaporation apparatus comprising
a housing defining an enclosure,
heat exchanger means disposed in said housing and dividing said enclosure into an evaporating compartment and a condensing compartment,
said means including
a first series of evaporator plate structures extending downwardly and inclined with the horizontal in one direction, and
a second series of evaporator plate structures extending downwardly and inclined with the horizontal in the opposite direction,
first nozzle means for spraying a pressurized liquid onto said first series of plate structures for evaporation purposes,
second nozzle means for spraying a pressurized liquid onto said second series of plate structures for evaporation purposes,
said first and second nozzle means being fixed adjacent opposite ends of the plate structures and in substantially facing relation with each other,
means for cyclically varying the flow of liquid to said first and second nozzle means in such a manner that the liquid from said first nozzle means sprays said first series of plate structures in sequence and the liquid from said second nozzle means sprays said second series of plate structures in sequence, and the velocity of the spray from said first nozzle means is at a maximum value when the spray from said second nozzle means is at a minimum value,
means for imparting additional heat to the vapor,
means for conducting the heated vapor from said evaporating compartment to said condensing compartment for condensation purposes,
first conduit structure for removing unevaporated liquid from said evaporation compartment, and
second conduit structure for removing the condensed vapors from said condensing compartment.

8. The structure recited in claim 7 in which the velocities of the sprays from said first and second nozzle means vary substantially sinusoidally and are substantially 180° out of phase in time.

9. The structure recited in claim 7 in which the velocities of the sprays from said first and second nozzle means vary substantially linearly and are substantially 180° out of phase in time.

10. The structure recited in claim 7 in which the velocities of the sprays frim said first and second nozzle means vary substantially rectilinearly and are out of phase substantially less than 180°, but are in phase during periods of minimum velocity.

References Cited by the Examiner
UNITED STATES PATENTS

| | | | |
|---|---|---|---|
| 2,558,752 | 7/51 | Holm | 165—5 |
| 2,766,969 | 10/56 | Cooper et al. | 165—5 |

ROBERT F. BURNETT, *Primary Examiner.*

NORMAN YUDKOFF, *Examiner.*